(12) United States Patent
Gold et al.

(10) Patent No.: US 12,426,096 B2
(45) Date of Patent: Sep. 23, 2025

(54) ENHANCED TIME ALIGNMENT TIMER AT TRANSMISSION CONFIGURATION INDICATOR STATE SWITCH

(71) Applicant: NOKIA TECHNOLOGIES OY, Espoo (FI)

(72) Inventors: Dimitri Gold, Espoo (FI); Lars Dalsgaard, Oulu (FI); Matha Deghel, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 379 days.

(21) Appl. No.: 17/958,086

(22) Filed: Sep. 30, 2022

(65) Prior Publication Data

US 2024/0114559 A1    Apr. 4, 2024

(51) Int. Cl.
*H04W 74/0833* (2024.01)
*H04L 1/1812* (2023.01)
*H04W 74/08* (2024.01)

(52) U.S. Cl.
CPC ....... *H04W 74/0841* (2013.01); *H04L 1/1812* (2013.01); *H04W 74/0866* (2013.01)

(58) Field of Classification Search
CPC ......... H04W 74/0841; H04W 74/0866; H04W 74/0833; H04W 56/0045; H04W 56/0065; H04L 1/1812
See application file for complete search history.

(56) References Cited

U.S. PATENT DOCUMENTS

| | | | | |
|---|---|---|---|---|
| 6,952,181 B2 * | 10/2005 | Karr | ......... | G01S 5/021 |
| | | | | 342/453 |
| 2010/0111067 A1 * | 5/2010 | Wu | ......... | H04W 56/0045 |
| | | | | 370/345 |
| 2016/0211936 A1 * | 7/2016 | Bottari | ........ | H04J 3/0682 |
| 2016/0345316 A1 * | 11/2016 | Kazmi | ........ | H04W 72/21 |
| 2018/0006770 A1 * | 1/2018 | Guo | ........ | H04B 7/0617 |
| 2020/0313747 A1 * | 10/2020 | Xu | ........ | H04B 7/0617 |
| 2022/0173850 A1 * | 6/2022 | Xu | ........ | H04L 5/0044 |
| 2022/0353907 A1 * | 11/2022 | Yang | ........ | H04W 74/02 |

(Continued)

OTHER PUBLICATIONS

R2-220XXXX (Year: 2022).*

(Continued)

*Primary Examiner* — Peter Chen
*Assistant Examiner* — Guoxing Fan
(74) *Attorney, Agent, or Firm* — Carter, DeLuca & Farrell LLP

(57) ABSTRACT

Systems, methods, apparatuses, and computer program products for enhanced handling time alignment timer at transmission configuration indicator state switch are provided. For example, a method can include performing a transmission configuration indicator state switch to a network element. The method can also include determining whether an uplink timing is aligned with respect to the network element. The method can further include determining whether a random access channel procedure is needed to adjust uplink timing in response to the determining that the uplink timing is not aligned. The method can additionally include adjusting the uplink transmit timing in response to a result of the determining whether random access channel procedure is needed to adjust uplink timing.

1 Claim, 7 Drawing Sheets

(56) References Cited

U.S. PATENT DOCUMENTS

| | | | | |
|---|---|---|---|---|
| 2023/0262635 A1* | 8/2023 | Tan | ................... | H04W 56/0045 |
| | | | | 370/350 |
| 2023/0362986 A1* | 11/2023 | Leng | ................ | H04W 74/0838 |
| 2024/0023045 A1* | 1/2024 | Da Silva | ............. | H04W 36/249 |
| 2024/0373419 A1* | 11/2024 | Jiang | ................ | H04W 56/0045 |
| 2024/0430763 A1* | 12/2024 | Dalsgaard | .......... | H04B 7/06964 |

OTHER PUBLICATIONS

R4-2210608 (Year: 2022).*
R2-21xxxxx (Year: 2021).*
3GPP TS 38.211 V17.2.0 (Jun. 2022), Technical Specification, 3rd Generation Partnership Project; Technical Specification Group Radio Access Network; NR; Physical channels and modulation (Release 17), Jun. 2022.
3GPP TS 38.321 V17.1.0 (Jun. 2022), Technical Specification, 3rd Generation Partnership Project; Technical Specification Group Radio Access Network; NR; Medium Access Control (MAC) protocol specification (Release 17), Jun. 2022.
Samsung, "New WID: MIMO Evolution for Downlink and Uplink," RP-213598, 3GPP TSG RAN Meeting #94e, Electronic Meeting, Dec. 6-17, 2021.
Samsung, "New WID on enhanced NR support for high speed train scenario in frequency range 2 (FR2)," RP-220985, 3GPP TSG-RAN Meeting #95e, Electronic Meeting, Mar. 17-23, 2022.
3GPP TS 38.133 V17.6.0 (Jun. 2022), Technical Specification, 3rd Generation Partnership Project; Technical Specification Group Radio Access Network; NR; Requirements for support of radio resource management (Release 17), Jun. 2022.

* cited by examiner

ENHANCED TIME ALIGNMENT TIMER AT TRANSMISSION CONFIGURATION INDICATOR STATE SWITCH

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to enhanced handling time alignment timer at transmission configuration indicator state switch.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least one memory including computer program. The at least one memory and the computer program can be configured to, with the at least one processor, cause the apparatus at least to perform a transmission configuration indicator state switch to a network element. The at least one memory and the computer program can also be configured to, with the at least one processor, cause the apparatus at least to perform determining whether an uplink timing is aligned with respect to the network element. The at least one memory and the computer program can further be configured to, with the at least one processor, cause the apparatus at least to perform determining whether a random access channel procedure is needed to adjust uplink timing in response to the determining that the uplink timing is not aligned. The at least one memory and the computer program can additionally be configured to, with the at least one processor, cause the apparatus at least to perform adjusting the uplink transmit timing in response to a result of the determining whether random access channel procedure is needed to adjust uplink timing.

An embodiment may be directed to a method. The method can include performing a transmission configuration indicator state switch to a network element. The method can also include determining whether an uplink timing is aligned with respect to the network element. The method can further include determining whether a random access channel procedure is needed to adjust uplink timing in response to the determining that the uplink timing is not aligned. The method can additionally include adjusting the uplink transmit timing in response to a result of the determining whether random access channel procedure is needed to adjust uplink timing.

An embodiment can be directed to an apparatus. The apparatus can include means for performing a transmission configuration indicator state switch to a network element. The apparatus can also include means for determining whether an uplink timing is aligned with respect to the network element. The apparatus can further include means for determining whether a random access channel procedure is needed to adjust uplink timing in response to the determining that the uplink timing is not aligned. The apparatus can additionally include means for adjusting the uplink transmit timing in response to a result of the determining whether random access channel procedure is needed to adjust uplink timing.

BRIEF DESCRIPTION OF THE DRAWINGS

For proper understanding of example embodiments, reference should be made to the accompanying drawings, wherein.

DETAILED DESCRIPTION

Figure 1:
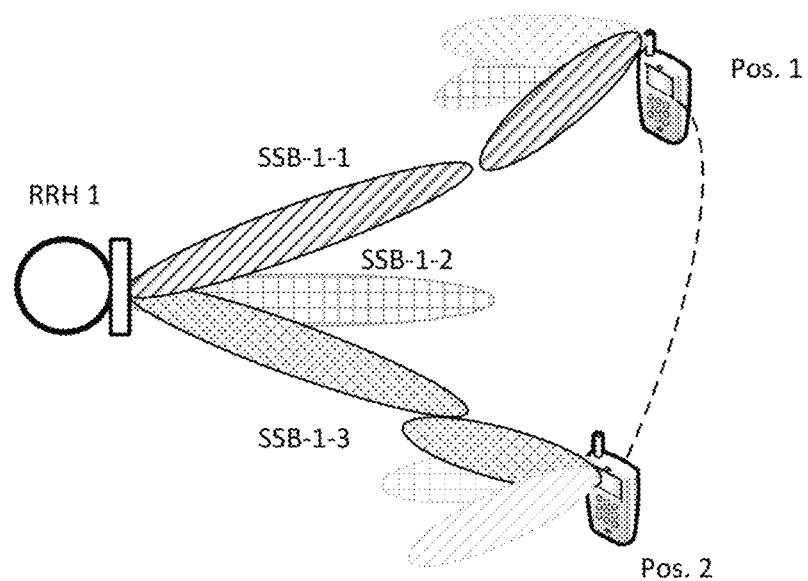
FIG. 1 illustrates a transmission configuration indicator state switch within a remote radio head.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing enhanced handling time alignment timer at transmission configuration indicator state switch, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to the following fifth generation (5G) new radio (NR) aspects: beam management (BM), uplink (UL) timing adjustment (TA), time adjustment and time alignment procedures, multiple input multiple output (MIMO) enactments, specifically multi-downlink control information (DCI) (multi-DCI) and multi-transmission and reception point (TRP)(multi-TRP) operation.

High-speed train (HST) deployment in high frequency bands, such as frequency range 2 (FR2) above 6 GHz, also referred as mmWave bands, are used as an illustrative example in the following. However, the principles discussed herein are not limited to HST FR2 scenarios. For example, certain embodiments can be used in any deployments where cells include multiple non-collocated TRPs and/or where beam switching between non-collocated TRPs is expected.

Beam management can include various aspects. For operations at higher carrier frequencies, both user equipment (UE) and network (NW) may make use of directional antennas to ensure a link budget that enables a reasonable cell range and link quality. When applying dynamically directional antennas, also often referred to as beam forming, at network and UE side the downlink (DL) coverage of transmission from gNB may cover a limited area and the UE reception of the DL may be within a certain limited coverage area.

Thus, there may be value from the UE and the network having beams that are aligned. There may also be benefit from a common understanding on at least which DL beam from the network is used for scheduling.

FIG. 1 illustrates a transmission configuration indicator state switch within a remote radio head. As illustrated in FIG. 1, the UE may be moving from position 1 towards position 2, and the serving beam may be changing from synchronization signal block (SSB)-1-1 to SSB-1-3. This change may be enabled by the UE performing and reporting beam-level measurements to the network which then requests the UE to use an appropriate DL beam, i.e., SSB-1-3 in the example. In addition to that, the UE may autonomously (i.e., based on own internal and non-standardized algorithm) change from one DL spatial setting (Rx beam setting) to another and/or even change the panel. For example, in FIG. 1, the UE RX beam is also different in between the Pos. 1 and Pos. 2. Beam level measurement can include, for example, layer 1 (L1) reference signal received power (L1-RSRP). The request may be with, for example, a transmission configuration indicator (TCI) state switch command.

In the UE beam switch the origin, in terms of physical source and/or transmitting panel of the source beam, such as SSB beam 1-1, and the target beam, such as SSB beam 1-3, may be the same. This may be referred to as collocated or quasi co-location (QCL) type-D in FR2.

Figure 2:
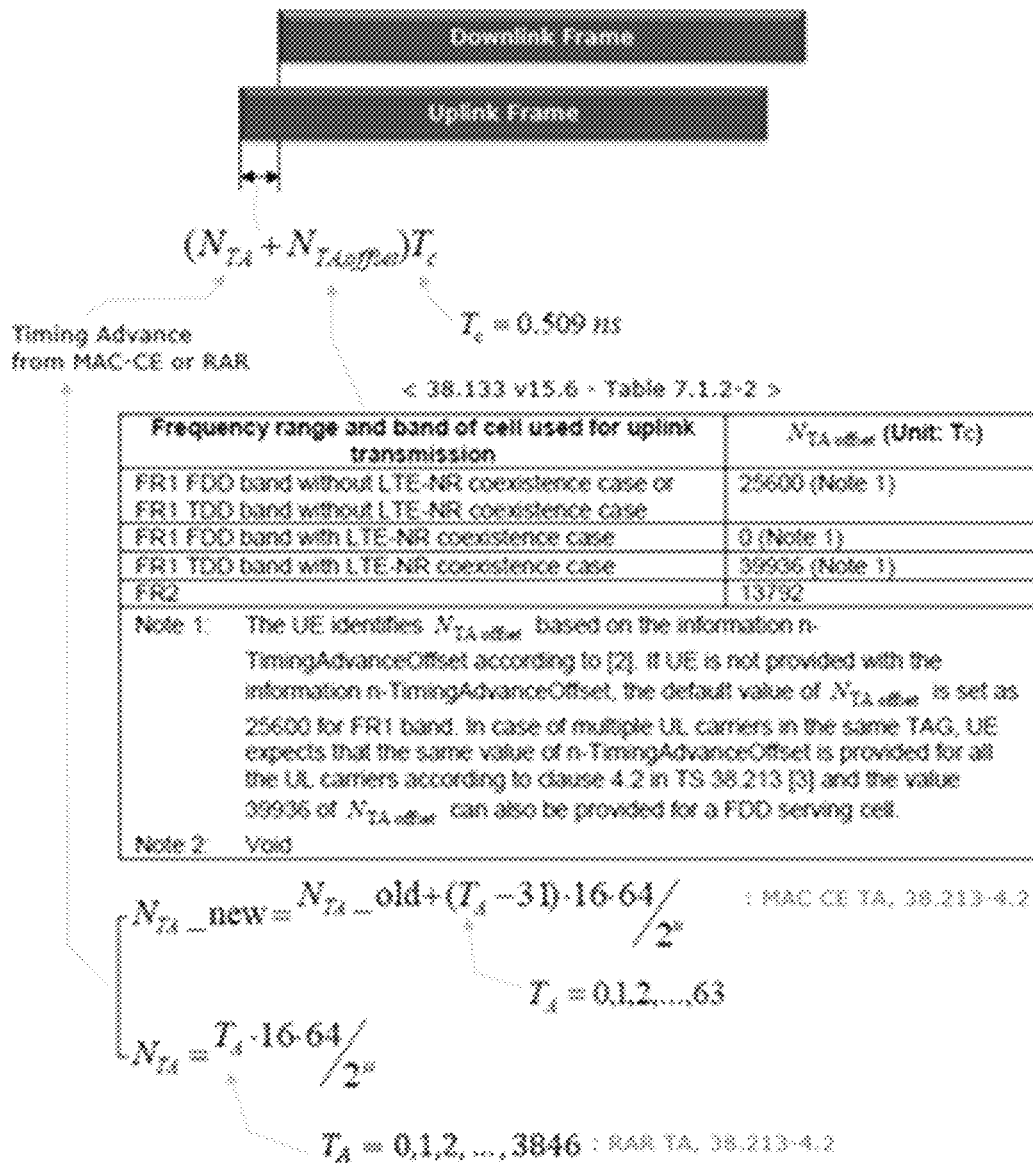
FIG. 2 illustrates an uplink timing advance mechanism in new radio.

FIG. 2 illustrates an uplink timing advance mechanism in new radio. The principles and functionality of NR timing advance (TA) is mostly the same as long term evolution (LTE) TA. UE may need to transmit UL signals ahead of reference DL/gNB timing to compensate for the dynamically changing channel propagation delay (PD) due to UE mobility. A TA value (N_TA) can be signaled from gNB to UE with a special notification, time adjustment command (TAC), that can enable the UE to adjust the UE's uplink transmission as shown in FIG. 2. This kind of UL adjustment can apply to physical uplink shared channel (PUSCH), physical uplink control channel (PUCCH), and sounding reference signal (SRS).

TA can be delivered to the UE through a random access response (RAR) or medium access control (MAC) control element (CE). The UE can ascertain the TA value from these two different MAC layer commands depending on situation. In a first case, the UE can determine the TA value through RAR. The second case may, therefore, be that the UE can determine the TA value through MAC CE. For the first UL message after a physical random access channel (PRACH), the UE can apply a TA value that the UE extracts from the RACH response (RAR). After the initial RACH process, the UE can apply the timing advance value that the UE extracts from timing advance MAC CE if the UE received the MAC CE.

As mentioned above, the UE can adjust UL transmission timing based on RAR during the RACH procedure. Once the initial attach is complete, the UE can adjust UL transmission based on the MAC CE, timing advance. A TAC field can be 6 bits, thereby allowing 64 steps in total ranging from −32 to 32 $T\_c$ in real timing. When $T\_c$ is 0.509, the range of the physical timing can be −2 microseconds (us) to 2 us with 120 kilohertz (kHz) subcarrier spacing. Thus, in the first case, in RAR, the absolute value of timing advance can be signaled to the UE. Whereas, in the second case, the MAC-CE TAC may send only incremental adjustments for the value of timing adjustment. Thus, both commands, RAR and MAC-CE, can be considered as UL transmit timing adjustment, but the RAR command can be setting the value of timing advance, and the MAC-CE command can be considered more of an adjustment.

Following third generation partnership project (3GPP) technical specification (TS) 38.133, clause 7.1.2.1, the UE can perform autonomous gradual timing adjustment following the change in the DL timing. For example, such autonomous gradual timing adjustment may be due to UE mobility. The maximum autonomous time adjustment step, $T\_q$, and the aggregate adjustment rate, $T\_p$, can be limited and are set forth in Table 7.1.2.1-1 of 3GPP TS 38.133.

Another aspect for consideration is the uplink timing alignment. A timing advance group (TAG) can include of one or more serving cells with the same uplink TA and same downlink timing reference cell. Each TAG can include at least one serving cell with configured uplink, and the mapping of each serving cell to a TAG can be configured by radio resource control (RRC). 3GPP TS 38.321 provides a definition of TAG. In that definition, a TAG that includes a special cell (SpCell) of a MAC entity can be referred to as primary TAG (PTAG), whereas the term secondary TAG (STAG) can refer to other TAGs. The SpCell can be a combination of the primary cell (PCell) and primary secondary cell (PSCell).

3GPP TS 38.321 defines an uplink time alignment procedure. Clause 5.2 thereof mentions a time alignment timer, timeAlignmentTimer, per TAG. This timer may be running only when an associated TAG is assumed to be UL time aligned. The timeAlignmentTimer can, on a per-TAG basis, control how long a MAC entity considers the serving cells belonging to the associated TAG to be uplink time aligned. The UE can start or restart the timer when a TAC MAC CE is received and an N_TA has been maintained with the indicated TAG. When the timer expires, if the timer is associated with PTAG, the MAC entity is to flush all HARQ buffers for all serving cells and if the timer is associated with a STAG, the MAC entity is to flush the HARQ buffers of the associated serving cells. The MAC entity may be prevented from perform any uplink transmission on a serving cell except the RA preamble and message A (MSGA) transmission when the timeAlignmentTimer associated with the TAG to which the serving cell belongs is not running.

Multiple input/multiple-output (MIMO) enhancements in release 18 (Rel-18) may include two TAs for uplink for multi-DCI for multi-TRP operations.

Figure 3:
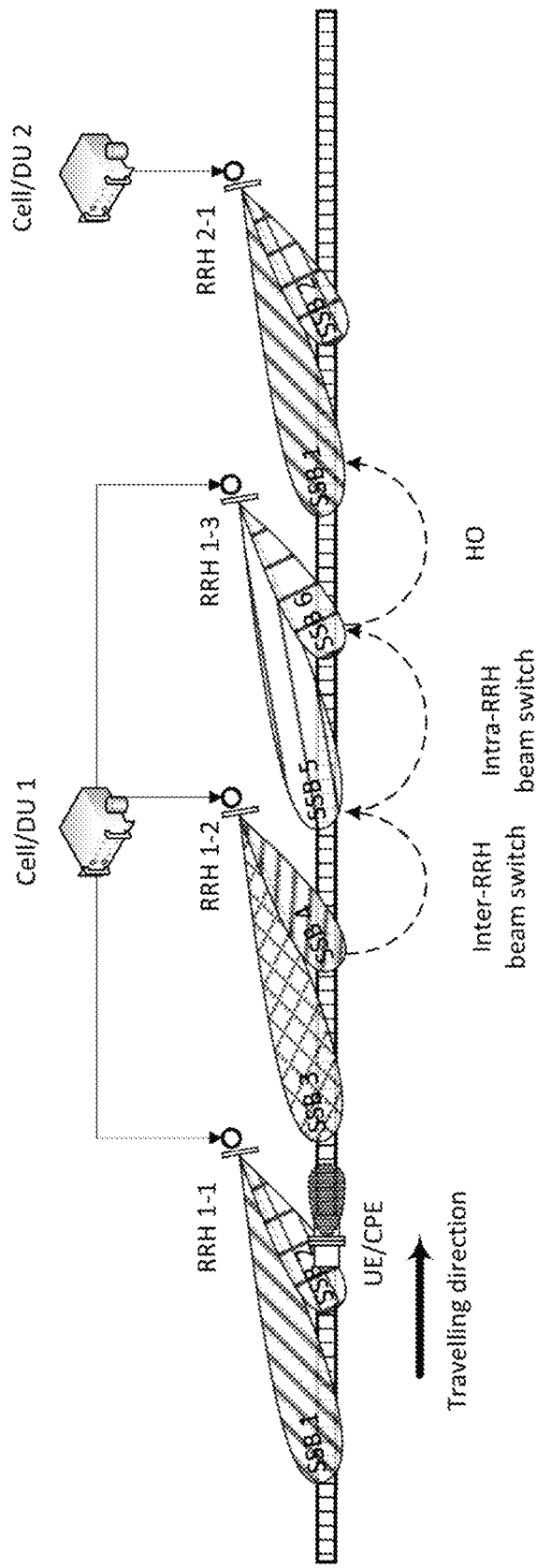
FIG. 3 illustrates a uni-directional high-speed train frequency range 2 deployment.

FIG. 3 illustrates a uni-directional high-speed train frequency range 2 deployment. UE behavior in an HST scenario when operating at higher frequencies, such as FR2, may include a UE traveling through the coverage of various gNBs. One such deployment is shown in FIG. 3. The UE may be a roof-mounted power class 6 UE.

To provide mobility and efficient hardware utilization, multiple remote radio heads (RRHs), which can also be referred to as access points (APs), base stations (BSs), or transmission and reception points (TRPs), can be distributed along the railway track and can be connected to a single distributed unit (DU).

Multiple DUs can be connected to a single central unit (CU). The synchronization signal/physical broadcast channel (PBCH) block (SSB) beams of non-collocated RRHs can share the same physical cell identifier (ID) (PCI).

A primary transmission scheme for HST FR2 may be dynamic point selection (DPS). In this case, only one RRH that provides the best signal quality may be transmitting at a time in the cell.

FIG. 3 also demonstrates different types of beam, also referred as transmission configuration indicator state, switches that are possible in HST FR2 scenario. An intra-RRH TCI state switch can occur when the source and target beams belong to the same cell and are collocated, for example transmitted from the same RRH. An inter-RRH TCI state switch can occur when the source and target beams belong to the same cell but are transmitted from the different non-collocated RRHs. A handover (HO) or inter-cell beam switch can occur when the source and target beams belong to the different cells.

Certain embodiments may provide a generic UL timing adjustment solution for situations when a serving beam/TCI state is switched to a non-collocated target beam and there is a significant propagation delay difference as to the origins of these beams.

For example, a large jump in propagation delay at the beam switch may be observed in an HST FR2 scenario, when the UE is leaving the coverage area of a RRH, and it is necessary to switch from a serving beam, SSB 2 in FIG. 3, to a non-collocated target beam, SSB 3 in FIG. 3. For an inter-RRH distance of 700 m the PD difference in DL between the source and target beams can be 2.3 us or more, which may be around 4 times the length of the cyclic prefix (CP), which may be 0.59 us for 120 kHz sub-carrier spacing (SCS).

Figure 4:
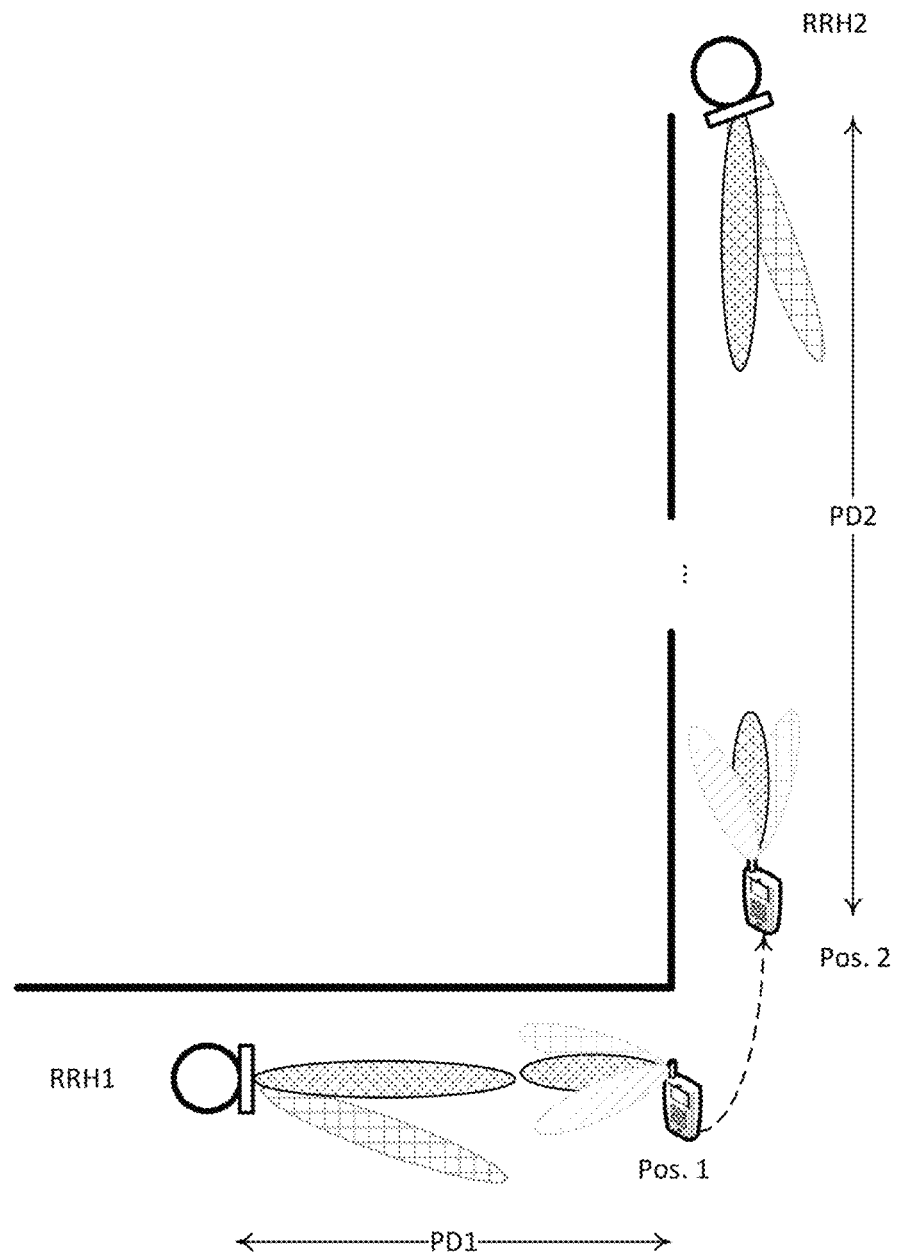
FIG. 4 illustrates an example of a large increase in propagation delay at a beam switch between remote radio heads.

FIG. 4 illustrates an example of a large increase in propagation delay at a beam switch between remote radio heads. In the example of FIG. 4, a UE may be moving from position 1 (Pos. 1) next to RRH1 to position 2 (Pos. 2) and a DL beam may need to be switched to a further away RRH2. In this case, the propagation delay difference dPD=PD1−PD2 can be significant, for example above the CP length.

However, beam switching does not imply any specific UL timing adjustment procedure to address a significant jump in propagation delay and needed UL transmit timing adjustment that may be 2*dPD.

Without certain embodiments, a TCI state switch, due to a co-location assumption, may not assume any general mechanism for UL timing adjustment similar to RAR included as a part of HO procedure. Following TS 38.321, Clause 5.2 timeAlignmentTimer per TAG may control how long the MAC entity considers the serving cells belonging to the associated TAG to be uplink time aligned. However, there may be situations, where UL time alignment is violated without certain embodiments, such as at inter-RRH TCI state switch. If timeAlignmentTimer is still running without certain embodiments, the UE can transmit UL signals, such as PUSCH or SRS without explicit network scheduling, with the wrong value of UL timing advance after the TCI state switch and before UL timing is adjusted, for example, before a new TAC command is received from the NW or PRACH procedure has passed.

Without certain embodiments, UL timing adjustment may depend on PD difference (dPD) between the source and target RRHs. Gradual timing adjustment, described at 3GPP TS 38.133, Clause 7.1.2.1, may be possible when dPD is minor, for example when source and target beams are co-located. Without certain embodiments, TAC MAC CE can be used for timing adjustment only if the target RRH can receive and measure the timing of the UL signal. The tracing window for UL signals at gNB may be limited to the range a few hundreds of nanoseconds at 120 KHz SCS. Likewise, the range of timing adjustment that can be signaled by TAC MAC CE may be limited to −2 us to 2 us at 120 kHz subcarrier spacing. Therefore, without certain embodiments TAC may be efficient in the best case for inter-RRH distances of below 300 m, based on 1 us*speed of light. In practice, the inter-RRH distance of 700 m in HST FR2 scenario and above may occur. Measurements and signaling of TAC MAC may have associated latency. Before the adjustment is complete, UE may still transmit in UL with wrong timing without certain embodiments. The absolute value of UL timing advance can be signaled to UE in RAR as a part of PRACH procedure. The range of necessary UL timing advance or timing adjustment values may be much larger than what can be signaled by TAC. If timeAlignmentTimer is expired, without certain embodiments MAC buffers have to be flushed. Therefore, an interruption in the data transition is expected in such cases.

In short, without certain embodiments, MAC entity, and specifically timeAlignmentTimer, behavior is not defined when the loss of uplink time alignment at the TCI state switch happens because of a large jump in propagation delay. Also, without certain embodiments the UE can transmit in UL with considerably wrong timing after the TCI state switch before the adjustment is done. In the general case without certain embodiments, timing adjustment is triggered by the network, which increases latency. If MAC for the UE is considered not time aligned with TAG, data buffers are flushed and connection is reset without certain embodiments.

Certain embodiments provide a light timeAlignmentTimer expiry or stopping without MAC HARQ buffer flushing and with automatic triggering of RA preamble transmission, when UL timing is not aligned anymore with a new target after a TCI state switch. In the case of a light timeAlignmentTimer expiry, the timer may be considered to have expired, but without triggering the actions that would be triggered had the timeAlignmentTimer expired by the count of the timer running out. Instead, a light expiry may result in a set of different actions. Those different actions may include at least one of the following: keep all HARQ buffers for all serving cells when, for example, the timer is associated with the PTAG or keep all HARQ buffers for all associated serving cells when, for example, the timer is associated with a STAG; notify RRC of timeAlignmentTimer 'light' expiry, if configured; keep any configured downlink assignments and configured uplink grants; keep any PUSCH resource for semi-persistent CSI reporting; consider all running timeAlignmentTimers as 'light' expired; maintain $N_{TA}$ (defined in TS 38.211) of all TAGs; and initiate Random Access Preamble transmission towards the target TCI state indicated in the TCI state switching command. By contrast, stopping the timer may not trigger specific additional actions, such as flushing the MAC HARQ buffer. Accordingly, if the MAC entity is configured to be unable to perform most uplink transmission when the timer is not running, the MAC entity can instead send a random access preamble. This random access preamble can be towards the target TCI state indicated in the TCI state switching command.

Figure 5:
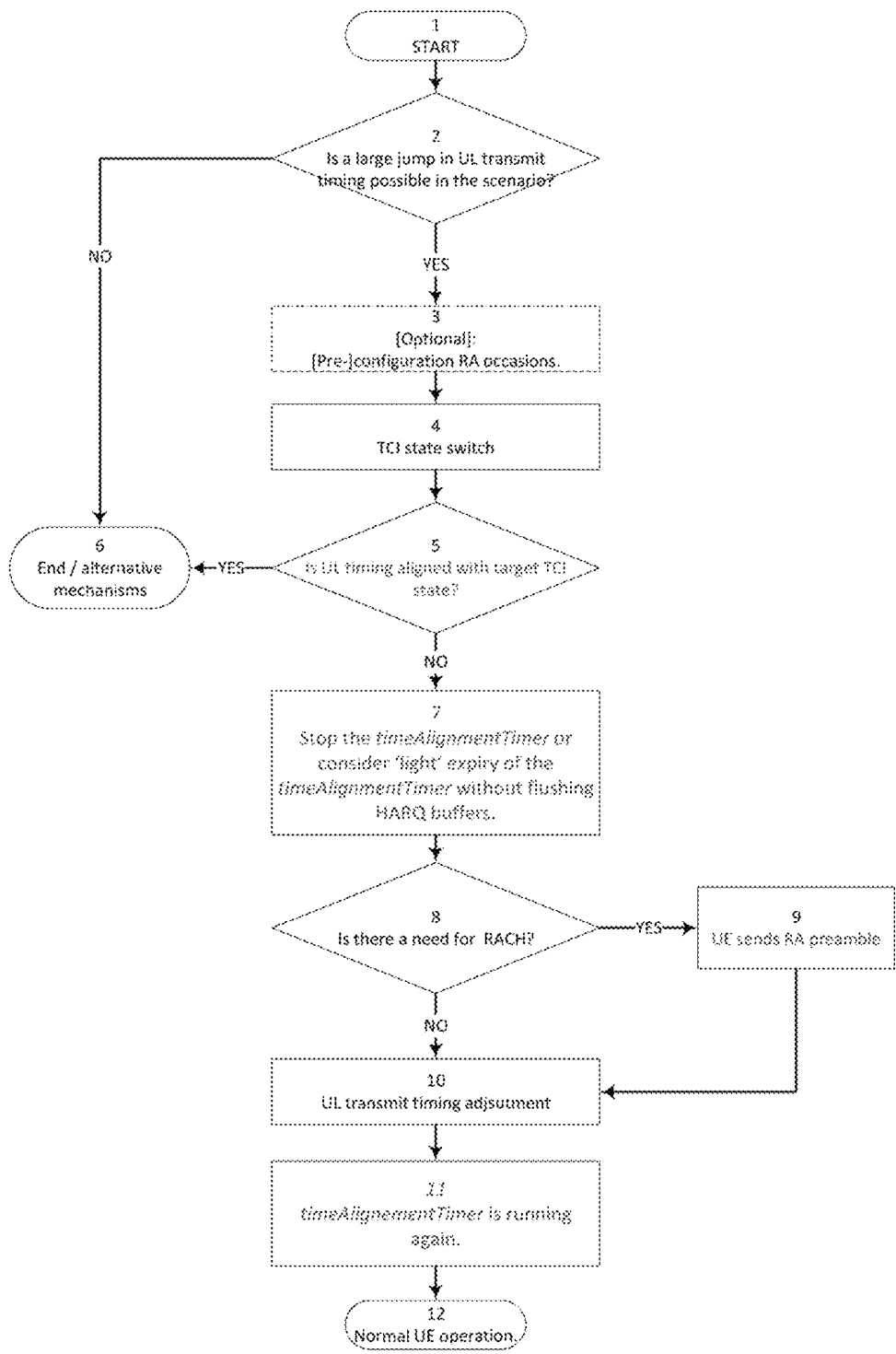
FIG. 5 illustrates a flow chart of a method according to certain embodiments.

FIG. 5 illustrates a flow chart of a method according to certain embodiments. As shown in FIG. 5, the method may start at procedure 1.

At procedure 2, the UE can determine whether there is a large jump in UL transmit timing possible in a scenario. Certain embodiments may be applied in the scenarios and deployments where the UL timing can become not aligned at the beam/TCI state switch. For example, when multiple non-collocated RRHs/TRPs belonging to the same cell and sharing the same PCI are used, or even belonging to different cells with different PCIs, certain transition schemes can be used, such as dynamic point selection (DPS), or certain deployments can be signaled, such as highSpeedMeasFlagFR2-r17 is configured, or the like.

At procedure 3, an association of preamble indexes and/or RACH resources with RRH/TRP may be pre-configured, in order to allow the UE to trigger RA preamble transmission corresponding to the RRH/TRP to which the TCI state switch is. For instance, if any RRH is represented by a set of SSBs, a set of preambles and/or set of RACH resources can be associated with this SSB set. This approach may be used for both contention-based RA or contention-free RA. In the latter case, the set may have only one preamble or RACH resource.

At procedure 4, a TCI state switch can be initiated by the network. At procedure 5, the UE can determine whether the UL timing of UE is aligned with the TCI state after the TCI state switch. For example, if the target TCI state belongs to another TAG than the source TCI state, and the UE already has UL timing aligned with this target TAG, then this UL timing can be used directly, and no further UL transmit timing adjustment is needed. Otherwise, the UE can identify whether the TCI state switch is associated with a large change of propagation delay or not. If the TCI state switch is associated with a large change of propagation delay, then the UL timing can be assumed not to be aligned with the target TCI state after the switch.

There may be multiple ways to the change in UL timing. For example, network assistance signaling of the type of TCI state switch, such as inter-RRH or intra-RRH, or mapping between the TCI states and RRHs can be used. If the switch is inter-RRH, then a large change in propagation delay can be expected, the UL timing may not be aligned, and a significant UL timing adjustment may be needed.

Another alternative may be to measure the DL propagation delay difference at the UE. If dPD is above a threshold, for example, above T_q=125 nanoseconds (ns), then UL timing may be assumed not to be aligned any more.

In yet another alternative, which may be combined with any of the above alternatives, the UE may determine that the UL timing is not aligned if the target TCI state corresponds to or is associated with a PCI that is different from the PCI corresponding to the source TCI state. The source TCI state may be the TCI state before TCI state switch.

At procedure 7, if a UE determines that a TCI state switch occurs and that the UL timing is not aligned any more, the UE can stop the timeAlignmentTimer or consider that the timeAlignmentTimer to be lightly expired without flushing the HARQ buffers.

At procedure 8, the UE can determine whether a RACH is needed. The mechanism for the UL timing adjustment can depend on whether a RACH is needed. For example, in HST FR2 deployments a large one-step timing adjustment, highSpeedLargeOneStepUL-TimingFR2-r17, flag can be configured by the network. In this case, the UE can adjust UL timing without assistance from the network.

In another example, timing adjustment can be signaled from the network, for example either in the form of TAC MAC CE, RAR, or in message A.

At procedure 9, to align UL timing with the target TCI state, RA preamble transmission can be triggered. Because the UE is allowed to transmit RA preamble when the timer has stopped, the preamble, such as a contention-free preamble, can be sent automatically whenever UL timing is not aligned anymore and cannot be fixed with the existing gradual timing adjustment or MAC based TAC, namely without RACH.

At procedure 10, the UL transmit timing, such as UL timing advance, of the UE can be adjusted.

At procedure 11, when the UL timing is aligned with the target TCI state, the UE MAC can start or restart timeAlignmentTimer again.

In certain embodiments, 3GPP TS 38.321, clause 5.2 may be modified to introduce new conditions when timeAlignmentTimer needs to be stopped, such as at the TCI state switch. If UE stops the timeAlignmentTimer at TCI state switch, the timer can be expired and there may be no need to flush MAC.

Another option can be to modify 3GPP TS 38.321, clause 5.2 to define a light expiry of the timeAlignmentTimer that does not require such a considerable interruption in data transmission as is implied by regular timer expiry. Then, after the timing adjustment is performed, the timeAlignmentTimer can be started or restarted again.

For example, 3GPP TS 38.321, clause 5.2 can be modified to recite that when a timeAlignmentTimer 'light' expires, the UE keeps all HARQ buffers for all serving cells or all associated serving cells; optionally the UE notifies RRC of timeAlignmentTimer 'light' expiry, if configured. The UE keeps any configured downlink assignments and configured uplink grants. The UE keeps any PUSCH resource for semi-persistent CSI reporting. Optionally, the UE considers all running timeAlignmentTimers as 'light' expired. Optionally, the US maintains N_TA, as defined in 3GPP TS 38.211, of all TAGs. The UE initiates random access preamble transmission towards the target TCI state indicated in the TCI state switching command. 3GPP TS 38.321, clause 5.2 can be further modified to recite that when the TCI state switch command is received at the UE and the transmit timing of TAG associated with target TCI state is not aligned with the timing of the target TCI state, the MAC entity considers timeAlignmentTimer associated with the target TCI state TAG as 'light' expired. These modifications to 3GPP TS 38.321, clause 5.2 are an example implementation.

For another example, 3GPP TS 38.321, clause 5.2 can be modified to recite that when the TCI state switch command is received at the UE and the transmit timing of TAG associated with target TCI state is not aligned with the timing of the target TCI state, the MAC entity stops timeAlignmentTimer associated with the target TCI state TAG.

It could be possible that the UE can support operation with multiple TAGs defined for the same cell. Thus, some SSBs/RSs can belong to one TAG whereas the others to another, for example based on the mapping between the SSBs and RRHs or TRPs, via association of SSBs/RSs to CORESETPoolIndex or TAG.

Therefore, in releases before Rel-18, it may be possible that non-collocated TCI states are switched within one TAG, whereas in Rel-18 two different TAGs may be used for non-collocated RRHs.

In the first case of same TAG, the UL transmit timing used for source TCI state may not be applicable to the target TCI state anymore, and UL timing may not be considered to be aligned between the source and target TCI states. In the second case with different TAGs, it may be assumed that UE is already time aligned with the target TCI state, namely that the UE already tracking timing/frequency of the target TAG even before the TCI state switch. This can be determined at procedure 5 in FIG. 5.

Figure 6:
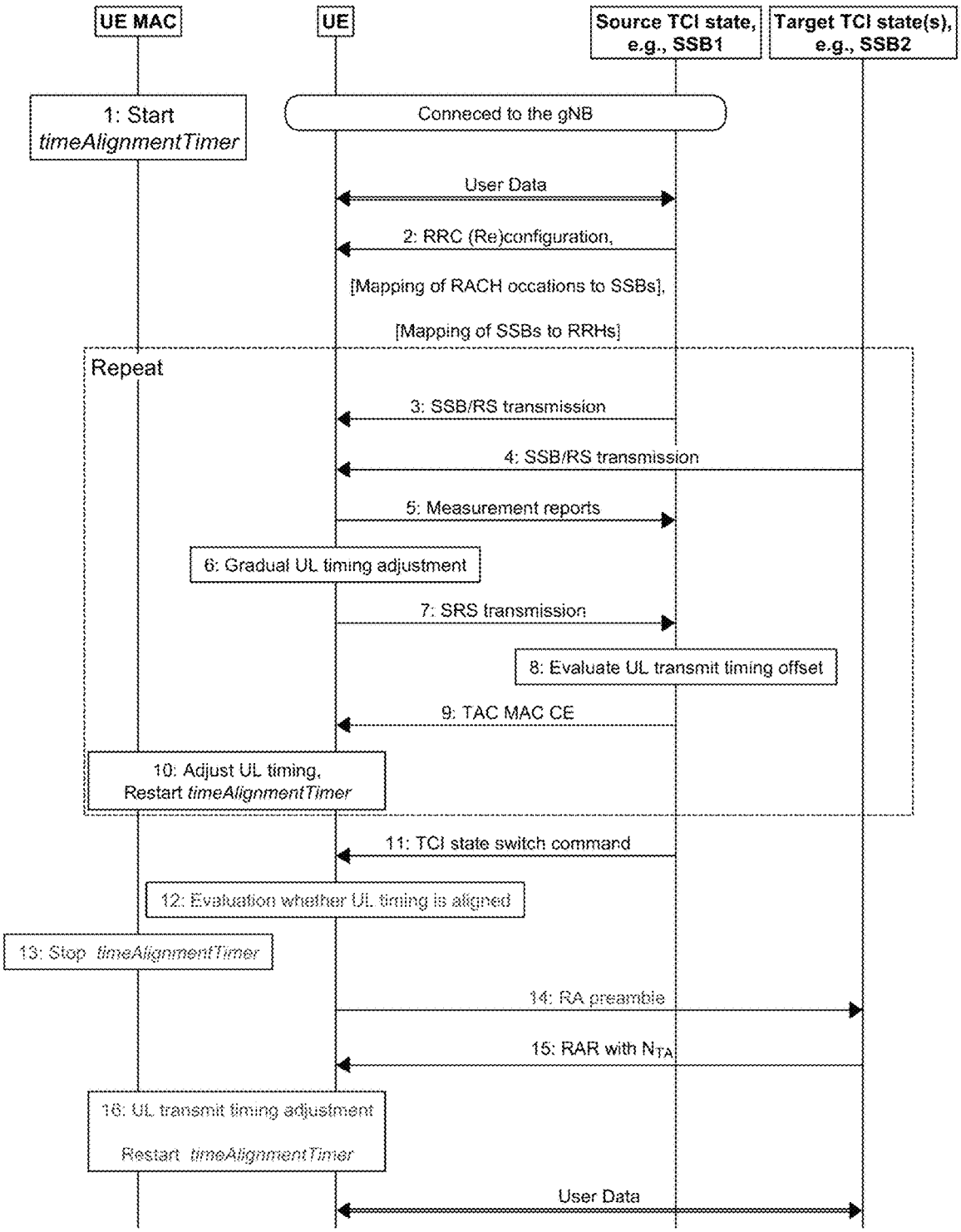
FIG. 6 illustrates a message sequence diagram of a method according to certain embodiments.

FIG. 6 illustrates a message sequence diagram of a method according to certain embodiments. As shown in FIG. 6, at 1, the UE MAC can start a timeAlignmentTimer. The UE can be connected to a gNB at source TCI state, such as SSB1. There may be exchange of user data with the gNB. At 2, there may be an RRC reconfiguration. There may be a mapping RACH to SSBs and a mapping of SSBs to RRHs, as described above. There can be SSB/RS transmission from the source TCI state, as well as from a target TCI state, such as SSB2, at 3 and 4 respectively. The UE may provide the gNB with measurement reports at 5. At 6, the UE may perform gradual UL timing adjustments. At 7, a SRS transmission may be sent to the source TCI state. At 8, the gNB may evaluate UL transmit timing offset. The gNB can provide an update to the timing advance using at TAC MAC CE at 9. At 10, the UE with the UE MAC can adjust UL timing and restart the timer. The process of adjust the timer at procedures 3 through 10 in FIG. 6 can be performed repeatedly.

Subsequently, at 11, the gNB can send a TCI state switch command to the UE. At 12, the UE can determine whether the UL timing is aligned with respect to the target TCI state. The UE MAC can stop the time alignment timer at 13, for example in the form of a light timer expiry, as discussed above. At 14, the UE can send a RA preamble to the target TCI state. At 15, the UE can receive a RAR with N_TA.

At 16, the UE and UE MAC can adjust UL transmit timing based on the RAR and can restart the timer. User data transmission can then continue.

Figure 7:
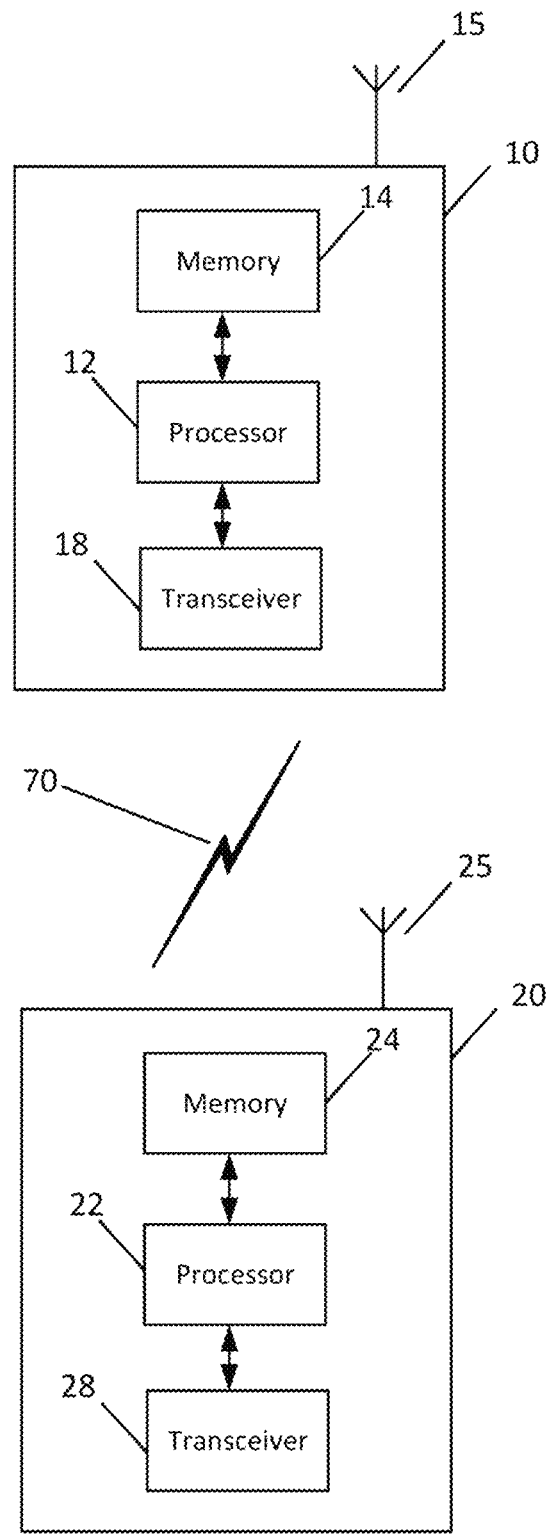
FIG. 7 illustrates an example block diagram of a system, according to an embodiment.

FIG. 7 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to enhanced handling time alignment timer at transmission configuration indicator state switch.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-6, or any other method described herein. In some embodiments, as discussed herein, apparatus 10 may be configured to perform a procedure relating to providing enhanced handling time alignment timer at transmission configuration indicator state switch, for example.

FIG. 7 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-6, or any other method described herein. For example, in an embodiment, apparatus 20 may be controlled to perform a process relating to providing enhanced handling time alignment timer at transmission configuration indicator state switch, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological effects. For example, in certain embodiments, the state of UE MAC, for example the operation of timeAlignmentTimer, can be aligned with the actual state of UL timing for the target TCI state after the TCI state switch. Harmful interference from UL transmission with a wrong UL timing can be avoided in certain embodiments. Moreover, certain embodiments can avoid overhead due to a need to initiate PRACH procedure with a PDCCH order from the network side. Thus, there may be lower delay before the UE can transmit again in UL after the TCI state switch.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY 5G 5th Generation
gNB 5G/NR base station
NR New Radio
RAN Radio Access Network
UE User Equipment
TRP Transmission Reception Point
UL Uplink
DL Downlink
DCI Downlink Control Information
MAC CE Medium Access Control Control Element
PUCCH Physical Uplink Control Channel
PUSCH Physical Uplink Shared Channel
PDCCH Physical Downlink Control Channel
PDSCH Physical Downlink Shared Channel
TCI Transmission Configuration Indicator
TDM Time Division Multiplexing
FR-1 Frequency Range 1
FR-2 Frequency Range 2
SRS Sounding Reference Signal
SSB Synchronization Signal Block
RS Reference Signal
RRH Remote Radio Head
TAC Timing Advance Command
TAG Timing Advance Group
DU Distributed Unit
RACH Random Access Channel
PD Propagation Delay
TA Time Adjustment
TAC Time Adjustment Command
AP Access Point
PRACH Physical RACH Random Access Channel
RFIC RF Interface
QoS Quality of Service
SI System Information
SIB System Information Block
SoC System on Chip
SS Synchronization Signal
SSB Synchronization Signal Block
TX Transceiver
RX Receiver
UE User Equipment

We claim:

1. An apparatus, comprising:

at least one processor; and at least one memory storing instructions that, when executed by the at least one processor, cause the apparatus at least to perform:

performing a transmission configuration indicator (TCI) state switch to a network element;

determining whether an uplink timing is aligned with respect to the network element, wherein the determining whether the uplink timing is aligned comprises:

comparing a difference in timing alignment to a threshold;

measuring a change in propagation delay between a first propagation delay to a source network element and a second propagation delay to the network element;

determining whether a physical cell identifier of a source network element is different than a physical cell identifier of the network element; and inferring a change in timing alignment from a preconfigured association of preamble indexes or random access channel resources with an access point, wherein the determining whether the uplink timing is aligned is responsive to determining that the apparatus is in a scenario where a change of propagation delay less than or equal to a threshold of 125 nanoseconds (ns) is expected and by determining that the uplink timing is not aligned when the target TCI state corresponds to or is associated with a physical cell identifier (PCI) that is different from a PCI corresponding to a source TCI state, and wherein the source TCI state is a TCI state before the TCI state switch;

determining whether a measured downlink propagation delay is above a threshold;

determining whether a random access channel procedure is needed to adjust uplink timing in response to the determining that the uplink timing is not aligned;

adjusting the uplink transmit timing in response to a result of the determining whether the random access channel procedure is needed to adjust uplink timing, wherein the adjusting is performed without network assistance when the result of the determining whether the random access channel procedure is needed is that the random access channel procedure is not needed;

stopping a time alignment timer in response to the uplink timing being determined not to be aligned;

maintaining a hybrid automatic repeat request buffer while performing the stopping of the time alignment timer in response to the uplink timing being determined not to be aligned;

restarting the time alignment timer in response to adjusting the uplink transmit timing;

sending a random access preamble to the network element in response to the determining that the random access channel procedure is needed; and receiving a random access response from the network in response to the random access preamble, wherein the adjusting the uplink transmit timing in response to receiving the random access response, wherein the stopping of the time alignment timer comprises a light expiry that keeps all HARQ automatic repeat request buffers for all serving cells when the time alignment timer is associated with a primary timing advance group.

* * * * *